United States Patent [19]
Roth et al.

[11] Patent Number: 5,250,106
[45] Date of Patent: Oct. 5, 1993

[54] PROCESS FOR WATER-REPELLENT IMPREGNATION OF MASONRY

[75] Inventors: Michael Roth, Burghausen, Fed. Rep. of Germany; Rosalia Bernbacher, Braunau am Inn, Austria

[73] Assignee: Wacker-Chemie GmbH, Munich, Fed. Rep. of Germany

[21] Appl. No.: 891,144

[22] Filed: Jun. 1, 1992

[30] Foreign Application Priority Data

Jun. 13, 1991 [DE] Fed. Rep. of Germany ....... 4119562

[51] Int. Cl.$^5$ ................................................ C09K 3/18
[52] U.S. Cl. .................................... 106/2; 106/287.11; 106/287.12; 106/287.14; 106/287.15; 106/287.16; 427/301; 427/419.8
[58] Field of Search ................ 106/2, 287.11, 287.12, 106/287.14, 287.15, 287.16; 427/301, 419.8

[56] References Cited

U.S. PATENT DOCUMENTS 4,661,551 4/1987 Mayer et al. ................... 106/287.11
4,757,106 2/1987 Mayer et al. ................... 106/287.11

FOREIGN PATENT DOCUMENTS 0186847 12/1985 European Pat. Off. .
0242798 4/1987 European Pat. Off. .
1177662 7/1967 United Kingdom .
1374611 3/1971 United Kingdom .

Primary Examiner—Helene Klemanski

[57] ABSTRACT

A process for rendering masonry water-repellent which comprises treating masonry which is alkaline, with a highly dispersed water-diluted impregnating composition which comprises (A1) an organoalkoxysilane and/or (A2) an organosiloxane containing alkoxy groups and (B) a water-soluble organic or inorganic acid salt of an organopolysiloxane, which in addition to other organosiloxane units contains siloxane units which carry monovalent SiC-bonded radicals containing basic nitrogen in amounts of at least 0.5% by weight, based on the weight of the organopolysiloxane. The treated masonry is particularly resistant to rising dampness.

12 Claims, No Drawings

PROCESS FOR WATER-REPELLENT IMPREGNATION OF MASONRY

The present invention relates to a process for rendering masonry materials water-repellent, and more particularly to a process for treating basic masonry materials with a highly dispersed, water-diluted impregnating composition containing an organosilicon compound containing alkoxy groups and (B) a water-soluble acid salt of an organopolysiloxane containing basic nitrogen.

BACKGROUND OF THE INVENTION

Alkali metal alkylsiliconates, alkali metal silicates, mixtures thereof and organosilicon compounds which contain alkoxy groups and are dissolved in organic solvents or in water or aqueous dispersions of organosilicon compounds containing alkoxy groups have been injected into masonry materials to combat rising dampness.

Leaflet 1-86, published by the masonry damp-removal section of the Wissenschaftlich-Technischer Arbeitskreis für Denkmalpflege und Bauwerksanierung e.V. (Scientific-Technical Study Group for Monument Preservation and Building Restoration e.V.), Munich, recommends preliminary rinsing of bore-holes with, for example, lime water before water-soluble compositions, such as alkali metal alkyl siliconates, alkali metal silicates and silanes, are injected therein. The water-soluble active compounds present in the injecting agents are precipitated by the calcium ions introduced into the wall, and gel.

The use of alkali metal alkyl siliconates dissolved in water, optionally, as described in GB-A-1,177,662 (C.T. Kyte; published on Jan. 14, 1970 to Gallwey Chemical Co. Ltd., Marlow, Great Britain), in combination with alkali metal silicate, is accompanied by the appearance in the masonry of water-soluble, hygroscopic carbonates capable of efflorescing. In thick masonry, the ingress of $CO_2$ from the air, which is necessary for the active compound to form, is much more difficult.

The water-soluble silanes which are suitable as the active compound in injecting agents for combating rising dampness in masonry, such as methylsilane-trismethyl glycolate, are injurious to health, and may even cause malformations.

GB-A-1,374,611 (J. G. Coombs Price; published on Nov. 20, 1974 to Dow Corning Ltd., London) describes a method of forming a vapor-tight barrier in masonry, in which organosilicon compounds containing alkoxy groups dissolved in organic solvents are introduced through holes in the masonry. The use of organic solvents increases the risk of fire and environmental pollution, especially in inhabited buildings.

U.S. Pat. No. 4,661,551 (H. Mayer et al.; published on Apr. 28, 1987 to Wacker-Chemie GmbH, Munich) describes the use of a highly dispersed water-diluted composition comprising isooctyltrimethoxysilane, a salt of a water-soluble acid and a nitrogen-containing organopolysiloxane, n-hexanol and glacial acetic acid for forming a barrier against rising dampness in a brick wall. This composition spreads rapidly in the damp masonry and reacts with the masonry to form a barrier which prevents further rising of the water. However, if the masonry is old, this composition does not perform well.

Therefore, it is an object of the present invention to provide a process for treating old masonry to impart water repellency thereto. Another object of the present invention is to provide a process for impregnating masonry to impart water repellency thereto which does not present a health hazard. A further object of the present invention is to provide a process for impregnating old masonry with water diluted compositions.

SUMMARY OF THE INVENTION

The foregoing objects and others which will become apparent from the following description are accomplished in accordance with this invention, generally speaking, by providing a process for impregnating masonry materials to impart water repellency thereto which comprises treating the masonry materials which have been rendered alkaline with a highly dispersed, water-diluted impregnating composition which comprises (A1) an organoalkoxysilane and/or (A2) an organosiloxane containing alkoxy groups and (B) a water-soluble organic or inorganic acid salt of an organopolysiloxane, which contains in addition to other organosiloxane units, siloxane units which have monovalent SiC-bonded radicals containing basic nitrogen in an amount of at least 0.5% by weight, based on the weight of the organopolysiloxane.

DESCRIPTION OF THE INVENTORY

The invention is based on the discovery that the dilute impregnating compositions of this invention are much more effective on basic masonry materials. Generally old masonry materials which have been exposed to the atmosphere are not basic. Therefore it is essential that the masonry materials be treated with an alkaline material to render them basic.

An effective barrier is formed in masonry materials against dampness rising from the ground if the active compounds of the impregnating composition are distributed rapidly in the damp masonry and react with the masonry before the upward-rising flow of dampness dilutes the active compounds to such an extent that they are not effective or flushes the active compounds out of the barrier zone. An alkaline medium in the masonry is necessary for rapid reaction of the active compounds used according to this invention.

If the base content of old masonry materials is increased according to this invention, old masonry reacts with the highly disperse, water-diluted impregnating compositions of this invention just as quickly as new alkaline masonry which has not yet been neutralized by the $CO_2$ content of the atmosphere. However, impregnation against dampness can also be improved in new masonry by the process of this invention.

All the strong inorganic and organic bases which are water-soluble and do not represent a health hazard are suitable for rendering the masonry alkaline.

However, the masonry is preferably rendered alkaline with aqueous alkali metal hydroxide or alkaline earth metal hydroxide solutions. Solutions of lithium hydroxide, sodium hydroxide, potassium hydroxide, calcium hydroxide, strontium hydroxide and barium hydroxide are most preferred. The use of an aqueous calcium hydroxide solution is particularly preferred for rendering the masonry alkaline, since excess calcium hydroxide bonds to the masonry very well and is solidified to lime by the $CO_2$ content of the atmosphere.

The concentrations of the aqueous alkali metal and alkaline earth metal hydroxide solutions are preferably from about 0.01 to 20% by weight. If a calcium hydroxide solution is used, concentrations of from 0.05% by weight up to saturation are preferred.

The aqueous alkaline solution can be introduced into the masonry before or after introduction of the impregnating compositions. However, the aqueous alkaline solution is preferably introduced into the masonry before injection of the impregnating composition. It is particularly advantageous to introduce the aqueous alkaline solution 2 to 3 days prior to injecting the impregnating composition. In this case, the aqueous alkaline solution is preferably introduced into the masonry via boreholes. This operation can be carried out with or without pressure. The same boreholes through which the impregnating composition is introduced are advantageously used.

It is not possible to render the impregnating compositions alkaline before introduction into the masonry since the dispersions are thereby destroyed and (A1) the organoalkoxysilane and/or (A2) the organosiloxane will not spread rapidly in the masonry.

The process of this invention is suitable for imparting water repellency to all types of masonry materials, such as, for example, bricks, reinforced and non-reinforced concrete, aerated concrete, Rhenish pumice, natural stones, including limestone, gypsum, slag bricks and sand-lime bricks.

The process of this invention is particularly suitable for impregnating damp old masonry materials. The process is preferably employed to combat rising dampness in masonry. Boreholes are preferably drilled into the wall on the outside and inside just above ground level. The impregnating composition and the aqueous alkaline solution are then introduced into these boreholes. The wall can be completely damp at this point. After the impregnating composition and the aqueous alkaline solution have reacted, a barrier layer forms and the masonry above the barrier layer becomes dry.

The impregnating composition used in this invention can contain one organoalkoxysilane (A1) or a mixture of several organoalkoxysilanes. The organoalkoxysilanes contain at least one and not more than 3 hydrocarbon radicals bonded via SiC and at least one and not more than 3 alkoxy radicals. The preparation of the organoalkoxysilanes is described in W. Noll, 2nd Edition 1968, Verlag Chemie, Weinheim, Chapter 3.3. The organoalkoxysilanes (A1) preferably contain 1 or 2 of the same or different, SiC-bonded monovalent $C_1$ to $C_{15}$ hydrocarbon radicals or halogen-substituted SiC-bonded monovalent $C_1$ to $C_{15}$-hydrocarbon radicals, and the other radicals are the same or different $C_1$ to $C_6$-alkoxy radicals.

Examples of the $C_1$ to $C_{15}$-hydrocarbon radicals are alkyl radicals, such as the methyl, ethyl, n-propyl, iso-propyl, n-butyl, iso-butyl, tert-butyl, n-pentyl, iso-pentyl, neo-pentyl and tertpentyl radical; hexyl radicals, such as the n-hexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; alkenyl radicals, such as the vinyl and the allyl radical; cycloalkyl radicals, such as cyclopentyl, cyclohexyl and cycloheptyl radicals and methylcyclohexyl radicals; aryl radicals, such as the phenyl, naphthyl, anthryl and phenanthryl radicals; alkaryl radicals, such as o-, m- and p-tolyl radicals; xylyl radicals and ethylphenyl radicals; and aralkyl radicals, such as the benzyl radical and the $\alpha$- and $\beta$-phenylethyl radicals.

Examples of halogen-substituted $C_1$ to $C_{15}$-hydrocarbon radicals are alkyl radicals substituted by fluorine, chlorine, bromine and iodine atoms, such as the 3,3,3-trifluoro-n-propyl radical, the 2,2,2,2',2',2'-hexafluoroisopropyl radical and the heptafluoroisopropyl radical, and halogenaryl radicals, such as the o-, m- and pchlorophenyl radical.

The unsubstituted $C_1$ to $C_8$-alkyl radicals and the phenyl radical are particularly preferred.

Examples of $C_1$ to $C_6$-alkoxy radicals of the organoalkoxysilane (A1) are the methoxy, ethoxy, n-propoxy, isopropoxy, n-butoxy, isobutoxy, sec-butoxy and tert-butoxy radical; pentyloxy radicals, such as the n-pentyloxy radical, and hexyloxy radicals, such as the n-hexyloxy radical. The methoxy and ethoxy radicals are particularly preferred.

The alkoxy radicals can be substituted by halogen atoms, but this is not preferred.

The impregnating composition used in accordance with this invention can contain one organosiloxane (A2) containing alkoxy groups or a mixture of several organosiloxanes. The organosiloxanes are oligomeric or polymeric organosilicon compounds in which the silicon atoms are linked via oxygen atoms and which contain SiC-bonded organic radicals. The organosiloxanes can additionally contain hydroxyl groups which facilitate bonding to the masonry.

The organosiloxanes should not exceed a viscosity of 2000 mm$^2$/s, since otherwise good distribution over the porous surfaces in the masonry would not be guaranteed.

The organosiloxanes (A2) described as examples in EP-B-53 223, have the general formula

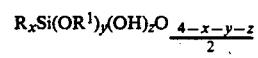

in which R represents the same or different monovalent SiC-bonded $C_1$ to $C_{15}$-hydrocarbon radicals or halogen-substituted, monovalent SiC-bonded $C_1$ to $C_{15}$-hydrocarbon radicals, $R_1$ represents the same or different monovalent $C_1$ to $C_6$-alkyl radicals, x is 0, 1, 2 or 3, with an average of from 0.9 to 1.8, y is 0, 1, 2 or 3, with an average of from 0.01 to 2.0, and z is 0, 1, 2 or 3, with an average of from 0.0 to 0.5, with the proviso that the sum of x, y and z is not more than 3.5 and the organosiloxane (A2) has a viscosity of not more than 300 mm$^2$/s at 25° C.

Organosiloxanes (A2) having viscosities of 5 to 100 mm$^2$/s are most preferred.

Examples of $C_1$ to $C_{15}$-hydrocarbon radicals are the same as the $C_1$ to $C_{15}$-hydrocarbon radicals and halogen-substituted $C_1$ to $C_{15}$-hydrocarbon radicals mentioned above for the organoalkoxysilanes (A1). The unsubstituted $C_1$ to $C_8$-alkyl radicals and the phenyl radical are particularly preferred.

Although it is not shown in the above formula, some of the radicals R can be replaced by hydrogen atoms bonded directly to silicon atoms. However, this is not preferred.

Examples of radicals $R_1$ are the methyl, ethyl, n-propyl, isopropyl, n-butyl, sec-butyl and tert-butyl radical; pentyl radicals, such as the n-pentyl radical, and hexyl radicals, such as the n-hexyl radical. The methyl and ethyl radicals are the preferred radicals.

Particularly preferred organosiloxanes (A2) are those which are obtained from the reaction of methyltrichlorosilane and a $C_1$ to $C_8$-alkyltrichlorosilane, or phenyltrichlorosilane with methanol or ethanol in the presence of water.

The salt (B) preferably used in the process of this invention is described in U.S. Pat. No. 4,661,551 to Mayer et al. The salts (B) which are obtained from polysiloxanes of the formula $$R^2_aR^3_b(OR^4)Si_cO_{\frac{4-a-b-c}{2}}$$

in which $R^2$ represents the same or different monovalent SiC-bonded $C_1$ to $C_{15}$-hydrocarbon radicals which are free from basic nitrogen, or hydrogen, $R^3$ represents the same or different monovalent SiC-bonded radicals containing basic nitrogen, $R^4$ represents hydrogen or the same or different $C_1$ to $C_4$-alkyl radicals, a is 0, 1, 2 or 3, with an average of from 0 to 2, and more preferably from 0 to 1.8, b is 0 or 1, with an average of from 0.1 to 0.6, and more preferably from 0.15 to 0.30, and c is 0, 1, 2 or 3, with an average of from 0.1 to 0.8, and more preferably from 0.2 to 0.6, and the sum of the average values of a, b and c is not more than 3.4. The viscosity at 25° C. is from 1 to 2000 and more preferably from 10 to 100 mm²/s.

Preferably, a hydrocarbon radical, and in particular a methyl radical, is bonded to each silicon atom onto which a hydrogen atom is bonded.

Examples of $C_1$ to $C_{15}$-hydrocarbon radicals represented by $R^2$ are the same as the examples of $C_1$ to $C_{15}$-hydrocarbon radicals mentioned above in the organoalkoxysilanes (A1). The methyl and the phenyl radicals are the preferred radicals.

Preferred radicals $R^3$ are those of the formula $$R^5_2NR^6—$$

in which $R^5$ represents hydrogen or the same or different $C_1$ to $C_{15}$-alkyl or $C_1$ to $C_{15}$-aminoalkyl radicals and $R^6$ represents a divalent $C_1$ to $C_{18}$-hydrocarbon radical.

The above examples of alkyl radicals represented by $R^2$ also apply to the $R^5$ radicals If the radical $R_5$ is a $C_1$ to $C_{15}$-aminoalkyl radical, the amino group thereof preferably carries two hydrogen atoms.

Preferably, at least one hydrogen atom is bonded to each nitrogen atom in the above formula.

Examples of divalent hydrocarbon radicals represented by $R^6$ are saturated alkylene radicals, such as the methylene and ethylene radicals, as well as propylene, butylene, pentylene, hexylene, cyclohexylene and octadecylene radicals, or unsaturated alkylene or arylene radicals, such as the hexenylene radical and phenylene radicals. The preferred alkylene radical is the n-propylene radical.

All the water-soluble organic and inorganic acids which, in their salt form, are chemically inert toward the other constituents of the impregnating composition are suitable for the preparation of the salt (B). Examples of such acids are hydrochloric, sulfuric, phosphoric, acetic and propionic acid. Acetic acid and propionic acid are the preferred acids.

The impregnating composition used according to the invention can contain, in addition to (A1) an alkoxysilane and/or (A2) an organosiloxane and (B) a water-soluble organic or inorganic acid salt of an organopolysiloxane, (C) monomeric and/or polymeric silicic acid esters which contain C1 to C6-alkoxy radicals and have a viscosity of not more than 20 mm²/s at 25° C. One specific silicic acid ester or a mixture of various silicic acid esters can be used. The preparation of the silicic acid esters (C) is described in W. Noll, 2nd Edition 1968, Verlag Chemie, Weinheim, Chapter 11.

Preferred silicic acid esters contain from $C_1$ to $C_3$-alkoxy radicals and have a viscosity of from 1 to 5 mm²/s at 25° C.

Examples of preferred silicic acid esters are tetramethyl silicate, tetraethyl silicate and tetraisopropyl silicate.

The undiluted impregnating compositions used according to this invention preferably contain from 20 to 80% by weight, and more preferably from 35 to 55% by weight, of organoalkoxysilane (A1).

The preferred amounts of organosiloxane (A2) in the undiluted compositions are from 5 to 80% by weight, and more preferably from 10 to 30% by weight.

The weight ratio of alkylalkoxysilane (A1) to organosiloxane (A2) in the undiluted compositions can range from 0:1 to 1:0, but is preferably 2:1 to 10:1.

The undiluted impregnating compositions used in this invention preferably contain from 5 to 50% by weight, and more preferably from 15 to 30% by weight of salt (B).

If the undiluted impregnating compositions used in this invention contain silicic acid esters (C), the amount thereof is not more than 30% by weight and more preferably from 5 to 15% by weight.

The impregnating compositions are generally diluted in a weight ratio of impregnating composition to water of from 1:4 to 1:30 and more preferably from 1:11 to 1:14. The water-diluted impregnating compositions are employed in the process of this invention in a highly dispersed form. The impregnating compositions give transparent mixtures on dilution with water.

The impregnating compositions can contain in addition to the constituents described above, fungicides, bactericides, algicides, microbicides, odoriferous substances, corrosion inhibitors and foam suppressants. The undiluted impregnating compositions contain additives preferably in amounts of from 0.001 to 1% by weight, and more preferably from 0.01 to 0.1% by weight.

Unless otherwise specified in the following examples, (a) all amounts are by weight; (b) all the pressures are at 0.10 MPa (absolute); and (c) all the temperatures are 25° C.

Examples

Preparation of the organosiloxane (A2)

A mixture containing 2 parts by weight of methyltrichlorosilane and 1 part by weight of i-octyltrichlorosilane was reacted with a mixture containing 1 part by weight of water and 2 parts by weight of methanol in a continuously operating reaction unit such that a hydrolysis product having a viscosity of 14 mm²/s was obtained.

Preparation of the salt (B)

About 150 g of N-(2-aminoethyl)-3-aminopropyltrimethoxysilane were added to a mixture containing 0.2 g of KOH in 4 g of methanol and 500 g of the organopolysiloxane of the empirical formula $$CH_3Si(OC_2H_5)_{0.8}O_{1.1}$$

having an average molecular weight of about 600 g/mol and a viscosity of about 20 mm²/s in a 1 liter threenecked flask with a stirrer, dropping funnel and reflux condenser, and the resultant mixture was heated at the boiling point under reflux for 6 hours. It was then cooled to 30° C. and mixed with 2.5 ml of 10% hydrochloric acid. The methanol was distilled off by heating to 140° C. and the salt (B) thus obtained was freed from KCl by filtration. The salt (B) contained 2.9% of basic nitrogen, based on its weight.

Preparation of the saturated calcium hydroxide solution

Calcium hydroxide or slaked lime is dispersed in water. The supernatant clear aqueous solution obtained after 24 hours is decanted and used in the process of this invention.

Preparation of the impregnating composition

About 24.2 parts by weight of the salt (B) described above were mixed successively with 6 parts by weight of glacial acetic acid, 45.6 parts by weight of isooctyltrimethoxysilane, 13.8 parts by weight of tetraethyl silicate and 10.4 parts by weight of the organosiloxane (A2) described above. After heating the resultant mixture at 90° C. for 5 hours, a clear solution was obtained. After cooling, the resultant impregnating composition was diluted with water in accordance with the data in the following examples. Highly dispersed, transparent mixtures were obtained.

Example 1

Series (a) fired bricks having the dimensions 24×12×7.5 cm, an average weight of 4091 g and a maximum water uptake capacity of 18.9% by weight were placed in water for 3 days. Series (b) fired bricks having the above dimensions, weight and water uptake were placed in a saturated calcium hydroxide solution. Both sets of bricks were removed after 3 days and and exposed to air at room temperature for 4 hours to dry the surface. Both series of bricks were then placed with the topside (topside is understood as meaning the two narrow sides of the brick, that is to say 12×7.5 cm) 1 cm deep in the impregnating composition prepared above, diluted 1:11 with water, for 24 hours. After weighting, the bricks of both test series were immediately placed with the same side 1 cm deep in water. The change in weight of the bricks was monitored by weekly weighing and the water content shown in Table I was calculated.

TABLE I

| Bricks | Water content of the bricks in grams | | | | | |
|---|---|---|---|---|---|---|
| | Starting Content | 1 wk. | 2 wks. | 3 wks. | 4 wks. | 5 wks. |
| Series (a) | 591.4 | 609.2 | 618.3 | 629.9 | 634.5 | 636.6 |
| Series (b) | 508.4 | 150.4 | 86.5 | 68.8 | 67.5 | 66.8 |

The starting content of water was calculated as the difference between the weight of the bricks after the bricks had been placed in the dilute impregnating composition for 24 hours and the weight of the bricks before the experiment.

Example 2

Fired bricks having the same dimensions as the bricks from Example 1 and a maximum water uptake capacity of 6.7% by weight were kept in water for 3 days and, after drying at room temperature for 4 hours, were placed with the topside 1 cm deep in the impregnating composition prepared above, diluted 1:9 with water, for 24 hours. After the bricks had been weighted, they were divided into two series. Series (a) was placed with the treated side 1 cm deep in tap-water and series (b) was placed with the treated side 1 cm deep in a saturated calcium hydroxide solution. The change in weight of the bricks was monitored by weekly weighing and the water content in Table II was calculated.

TABLE II

| Bricks | Water content of the bricks in grams | | | | | | |
|---|---|---|---|---|---|---|---|
| | A[1] | 1 wk. | 2 wks. | 3 wks. | 4 wks. | 5 wks. | 6 wks. | 7 wks. |
| Series (a) | 247.1 | 253.8 | 256.4 | 261.4 | 264.0 | 267.3 | 272.1 | 273.2 |
| Series (b) | 239.0 | 243.7 | 259.7 | 251.7 | 243.2 | 43.7 | 31.0 | 25.0 |

A[1]: The starting content of water was calculated as the difference between the weight of the bricks after the bricks had been placed in the dilute impregnating composition for 24 hours and the weight of the bricks before the experiment.

What is claimed is:

1. A process for imparting water repellency to masonry materials which comprises treating masonry materials which have been rendered alkaline, with a highly dispersed, water-diluted impregnating composition comprising (A1) an organosiloxane or (A2) an organosiloxane containing alkoxy groups or mixtures of (A1) and (A2) and (B) a water soluble organic or inorganic acid salt of an organopolysiloxane, which in addition to other organosiloxane units contains siloxane units which have monovalent SiC-bonded radicals containing basic nitrogen in amounts of at least 0.5% by weight of basic nitrogen, based on the weight of the organopolysiloxane.

2. The process of claim 1, wherein the masonry material is rendered alkaline with an aqueous alkali metal hydroxide solution or alkaline earth metal hydroxide solution.

3. The process of claim 1, wherein the masonry material is rendered alkaline with an aqueous calcium hydroxide solution.

4. The process of claim 1, wherein the masonry material is rendered alkaline by introducing an aqueous alkaline solution into the masonry material via boreholes.

5. The process of claim 1, wherein an undiluted impregnating composition contains from 20 to 80% by weight of organoalkoxysilane (A1).

6. The process of claim 1, wherein the organoalkoxysilane (A1) has 1 or 2 SiC-bonded monovalent $C_1$ to $C_{15}$-hydrocarbon radicals and the other radicals are $C_1$ to $C_6$-alkoxy radicals.

7. The process of claim 1, wherein an undiluted impregnating composition contains from 5 to 50% by weight of salt (B).

8. The process of claim 1, wherein an undiluted impregnating composition contains from 5 to 80% by weight of organosiloxane (A2).

9. The process of claim 1, wherein the organosiloxane (A2) has the general formula

in which R is a monovalent SiC-bonded $C_1$ to $C_{15}$-hydrocarbon radical or a halogen-substituted, monovalent SiC-bonded $C_1$ to $C_{15}$-hydrocarbon radical, $R^1$ is a monovalent $C_1$ to $C_6$-alkyl radical, x is 0, 1, 2 or 3, with an average of from 0.9 to 1.8, y is 0, 1, 2, or 3, with an average of from 0.01 to 2.0, and z is 0, 1, 2 or 3, with an average of from 0.0 to 0.5, with the proviso that the sum of x, y and z is not more than 3.5 and the organosiloxane (A2) has a viscosity of not more than 300 mm$^2$/s at 25° C.

10. The process of claim 1, wherein the impregnating composition also contains (C) monomeric or polymeric silicic acid esters or mixtures thereof having $C_1$ to $C_6$-alkoxy radicals and a viscosity of not more than 20 mm$^2$/s at 25° C.

11. The process of claim 1, wherein the masonry material is treated with an aqueous alkaline solution after the masonry material has been treated with the water-diluted impregnating composition.

12. A process for preventing dampness from rising in masonry which comprises applying an alkaline solution to masonry to render the masonry alkaline and thereafter treating the alkaline masonry with a highly dispersed, water-diluted impregnating composition comprising (A1) an organosiloxane or (A2) an organosiloxane containing alkoxy groups or mixtures of (A1) and (A2) and (B) a water soluble organic or inorganic acid salt of an organopolysiloxane, which in addition to other organosiloxane units contains siloxane units which have monovalent SiC-bonded radicals containing basic nitrogen in amounts of at least 0.5% by weight based on the weight of the organopolysiloxane.

* * * * *

UNITED STATES PATENT AND TRADEMARK OFFICE
CERTIFICATE OF CORRECTION

PATENT NO. : 5,250,106
DATED : October 5, 1993
INVENTOR(S) : Michael Roth and Rosalia Bernbacher It is certified that error appears in the above-identified patent and that said Letters Patent is hereby corrected as shown below:

In claim 1, column 8, line 22, after "(A1)", delete "an organosiloxane" and insert in lieu of --- an organoalkoxysilane ---.

In claim 12, column 10, line 4, after "(A1)" delete "an organosiloxane" and insert in lieu of --- an organoalkoxysilane ---.

Signed and Sealed this

Twelfth Day of April, 1994

Attest:

BRUCE LEHMAN

Attesting Officer    Commissioner of Patents and Trademarks